United States Patent
Marquar et al.

(10) Patent No.: US 8,297,600 B2
(45) Date of Patent: Oct. 30, 2012

(54) PLASTIC SPRING FOR A MOTOR VEHICLE CHASSIS

(75) Inventors: Hendrik Marquar, Schweinfurt (DE); Manfred Schuler, Dittelbrunn (DE); Josef Renn, Dettelbach (DE); Klaus Stretz, Hassfurt (DE); Karin Sundermann, Sennfeld (DE); Michael Zutzmann, Schweinfurt (DE); Werner Hufenbach, Dresden (DE); Martin Lepper, Dresden (DE); Jens Werner, Coswig (DE); Christian Köhler, Dresden (DE)

(73) Assignees: ZF Friedrichshafen AG, Friedrichshafen (DE); Leichtbau-Zentrum Sachsen GmbH, Dresden (DE)

( * ) Notice: Subject to any disclaimer, the term of this patent is extended or adjusted under 35 U.S.C. 154(b) by 229 days.

(21) Appl. No.: 12/878,401

(22) Filed: Sep. 9, 2010

(65) Prior Publication Data
US 2011/0057369 A1 Mar. 10, 2011

(30) Foreign Application Priority Data
Sep. 9, 2009 (DE) .......................... 10 2009 029 300

(51) Int. Cl.
*B60G 13/00* (2006.01)
*B60G 11/58* (2006.01)

(52) U.S. Cl. .......... 267/34; 267/221; 267/175; 267/177; 267/180; 280/124.155

(58) Field of Classification Search .............. 267/33–34, 267/175, 177, 180, 219–221; 280/124.155
See application file for complete search history.

(56) References Cited

U.S. PATENT DOCUMENTS

| 3,263,983 A * | 8/1966 | Bliven .......................... 267/220 |
| 3,584,856 A * | 6/1971 | Desbois ......................... 267/34 |
| 4,036,335 A * | 7/1977 | Thompson et al. ......... 188/282.9 |
| 4,235,426 A * | 11/1980 | Sullivan et al. ................ 267/220 |
| 4,817,928 A * | 4/1989 | Paton ............................ 267/219 |
| 5,044,614 A * | 9/1991 | Rau ............................... 267/221 |
| 5,052,665 A * | 10/1991 | Sakuragi ....................... 267/220 |
| 5,133,573 A * | 7/1992 | Kijima et al. .......... 280/124.155 |
| 5,996,982 A * | 12/1999 | Bell .............................. 267/221 |
| 6,767,010 B2 | 7/2004 | Miller et al. |
| 2007/0267792 A1 * | 11/2007 | Elmoselhy .................... 267/195 |
| 2009/0200721 A1 * | 8/2009 | Kobelev et al. ............... 267/195 |

FOREIGN PATENT DOCUMENTS

| DE | AS 1 009 500 | 1/1958 |
| DE | 1 655 642 | 6/1971 |
| DE | 23 40 917 | 2/1975 |
| DE | 101 44 163 | 4/2003 |
| GB | 698 322 | 10/1953 |

* cited by examiner

*Primary Examiner* — Christopher Schwartz
(74) *Attorney, Agent, or Firm* — Cozen O'Connor

(57) ABSTRACT

A plastic spring having a corrugated tubular body with connection surfaces at its ends for transmitting force between two structural component parts which are movable relative to one another. A connection surface of the plastic spring is constructed as a tubular body which engages in a cup element of one of the supporting structural component parts. The cup element can be filled with a displacement mass, and the tubular body accordingly carries out a displacing movement within the cup element for axially adjusting the preloading of the plastic spring.

22 Claims, 5 Drawing Sheets

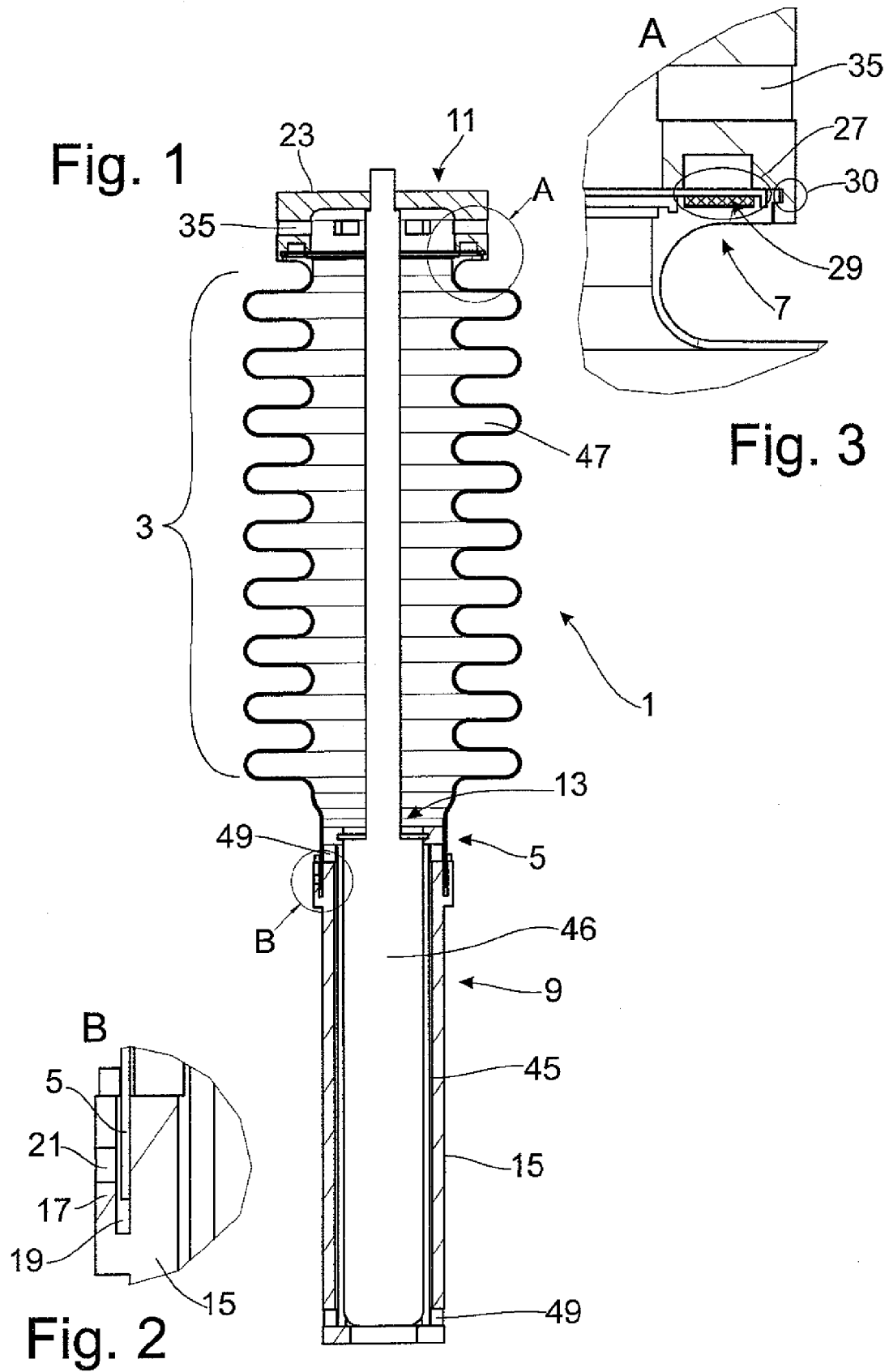

PLASTIC SPRING FOR A MOTOR VEHICLE CHASSIS

BACKGROUND OF THE INVENTION

1. Field of the Invention

The invention is directed to a plastic spring.

2. Description of the Related Art

DE-AS 1 009 500 discloses a hollow suspension body made of rubber or resilient plastic for absorbing shocks in vehicles having a cylindrical hollow body with connections at the ends. These connections at the ends impede an arrangement in which a vibration damper is mounted coaxial to the spring.

GB 698 322 is directed to a hollow suspension body made of rubber which is tensioned axially between two spring plates. A first spring plate is fastened to a cylinder and a second spring plate is fastened to a central rod of the suspension arrangement. The hollow suspension body contacts the piston rod radially so that frictional forces occur between the piston rod and the hollow suspension body with every movement of the suspension.

A spring element for absorbing shocks in vehicle bodies is known from DE 1 655 642 A1. This spring element has a corrugated tube profile and comprises a fiber-reinforced plastic. The spring element is tensioned at the ends to be tight against pressure.

Also noteworthy in this connection is DE 23 40 917 A1 which likewise discloses a spring element made of plastic. However, in contrast to the spring element according to DE 1 655 642, a compressed gas filling is not used, and a simple contact surface on its front is sufficient to assume the supporting load. When the spring element is compressed, the air filling contained in the spring element can be vented by way of at least one opening.

DE 101 44 163 C1 discloses a suspension strut with a spring plate that can be adjusted with respect to height. The spring plate has a sleeve portion arranged in a chamber on the cylinder side. The sleeve portion is displaced axially in the chamber by filling the chamber and the preloading of a helical compression spring. The spring plate is made of a metal material, and the sleeve portion is formed from a plate by deep drawing. Unfortunately, this limits the useful length of the sleeve portion.

Although already known for a long time, the described spring elements in this constructional form have failed to gain acceptance in vehicle engineering.

SUMMARY OF THE INVENTION

An object of the present invention is a plastic spring that it can be manufactured on a large scale for use in a vehicle.

According to one embodiment of the invention, a connection surface of a plastic spring is constructed as a tubular body that engages in a cup element of a supporting structural component part, the cup element can be filled with a displacement mass, and the tubular body accordingly carries out a displacing movement within the cup element for axially adjusting the preloading of the plastic spring.

Plastic is preferably used as a displacement mass. This displacement mass bonds easily with the tubular body so that the spring is permanently connected to the cup element of the supporting structural component part also so as to be fixed with respect to relative rotation.

The tubular body is preferably formed integral with a corrugated tubular body. One advantage of the invention is that a spring plate, as in a helical compression spring, can be dispensed with. In many applications, the spring must be positioned on a spring plate in an exact manner. Because the tubular body is formed integrally with the springing portion of the plastic spring, the correct installation position and positioning of the spring is always ensured.

In one embodiment, the cup element is a component part of an outer cylinder of a suspension strut, and the cylinder is also made of plastic. In this way, plastics can be used consistently between the spring and the cylinder.

According to one embodiment, the plastic spring has an axially extending fiber reinforcement whose fiber length substantially corresponds to the axial distance between the connection surfaces.

The springing action of the plastic spring is not determined by the portions of plastic, but by the fiber reinforcement. The plastic proportions function as a glue between the threads of the reinforcement. Further, the plastic portions close the intermediate spaces inside the fiber reinforcement so that the plastic spring protects against dirt.

At least 50% of the axially extending fibers have an angular deviation of less than 30° relative to the longitudinal axis of the plastic spring.

In one embodiment, the plastic spring has a fiber reinforcement extending in circumferential direction. The fiber length corresponds at least to the coil diameter of the corrugated tubular body.

The fiber reinforcement is undulatory and is preferably formed by a woven fabric. Therefore, the spring characteristic of the plastic spring can be altered by changing various parameters, i.e., through the volume and the shape of the corrugated tubular body, e.g., with respect to the wall thickness and dimensioning of the corrugation profile. On the other hand, the spring characteristic can also be influenced by the fiber reinforcement, e.g., by the quantity of reinforcement layers, the course of the thread, or the choice of material.

The connection surface can be constructed as an axial bearing. In an application where the supporting structural component part and the structural component part to be supported execute a rotational movement relative to one another, the plastic spring can serve as a support for the axial bearing. There is no need for a separate structural component part that is adapted separately, e.g., to maintain bearing play.

The connection surface can have an annular groove for receiving a bearing ring. The bearing ring is a possible constructional form of a sliding bearing.

Alternatively, it is possible for the connection surface to have a rolling bearing.

In a particularly simple variant of the bearing in the area of the connection surface, an annular groove has a lubricant filling.

The connection surface has a catch mechanism for fastening to one of the structural component parts that are movable relative to one another. This eliminates the need for separate clamping device that fixes the plastic spring to one of the structural component parts are movable relative to one another.

The plastic spring should be deliberately vented. The plastic spring preferably has at least one vent opening which is controlled by a check valve.

A check valve is formed by a flexible valve body supported in a convolution of the corrugated tubular body. In this way, the corrugated tubular body effectively forms a part of the check valve.

The vent opening is formed in a convolution of the corrugated tubular body. The risk of dirt entering from the side is appreciably minimized when the vent opening is constructed in the radially extending annular areas of the corrugated tubular body.

For the simple and compact possible valve body, the valve body has a groove shape supported in the convolution by a groove base.

A vibration damper can be arranged inside the cylinder as a cartridge. At least one ventilation channel connected to an interior space in the plastic spring is provided between an outer cylinder of the cartridge and the inner wall of the cylinder, which solves the problem of removing heat from the vibration damper.

The ventilation channel has at least one connection opening to the environment of the cylinder. The plastic spring acts like an air pump for the ventilation channel and accordingly carries the heat occurring during operation of the vibration damper out of the cylinder.

Further, the plastic spring forms a throttle cross section between at least two adjacent convolutions of the corrugated tubular body in the operating state of the solid length. In addition to the deformation work of the spring, the damping work can be made use of additionally when air is displaced from the compressed convolutions.

At least one groove is formed in the wall of the corrugated tubular body, which groove determines at least a residual cross section between a volume enclosed by a convolution and an area located outside this convolution. The groove cross section determines the effective throttle cross section in solid length.

To facilitate production, the groove extends substantially parallel to the longitudinal axis when the spring is relaxed.

The at least one groove can be formed at the inner wall and/or at the outer wall of the corrugated tubular body to dimension the throttle effect.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail with reference to the following description of the drawings.

In the drawings:

FIG. 1 is a plastic spring with a vibration damper;

FIG. 2 is a detail showing the adjustment of the spring preloading;

FIG. 3 is a detail showing the connection surface with bearing;

DETAILED DESCRIPTION OF THE PRESENTLY PREFERRED EMBODIMENTS

Figure 4:
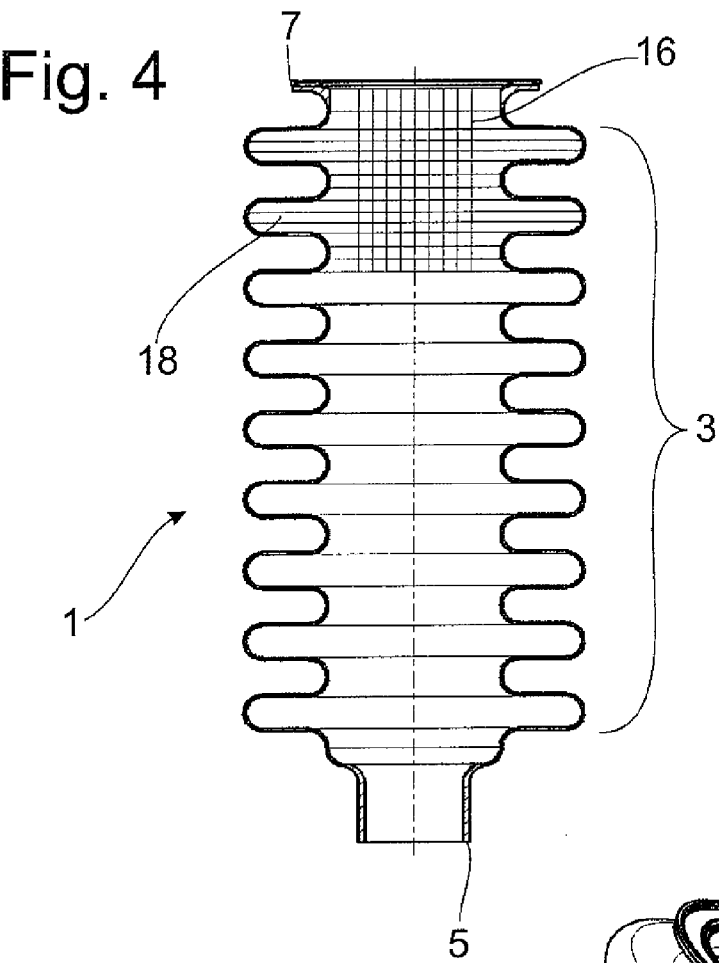
FIG. 4 is a sectional view of the plastic spring as individual part.

FIG. 1 shows a plastic spring 1 which has a corrugated tubular body 3 and connection surfaces 5, 7 at the ends for transmitting force between two structural component parts 9, 11 which are movable relative to one another. In this diagram, the plastic spring 1 is combined with a vibration damper 13 constructed as a cartridge inside a cylinder 15. The plastic spring 1 can also be used in other applications. The plastic spring 1 has an axially extending fiber reinforcement 16, shown FIG. 4, whose fiber length substantially corresponds to the axial distance between the connection surfaces 5, 7.

Preferably at least about 50% of the axially extending fibers have an angular deviation of less than about 30° relative to the longitudinal axis of the plastic spring.

In addition, the plastic spring can have a fiber reinforcement 18, shown in FIG. 4, extending in circumferential direction, wherein the fiber length corresponds at least to the coil diameter of the corrugated tubular body 3.

The fiber reinforcements 16, 18 are embedded in the plastic spring in woven form. Apart from the springing function, based on the fiber reinforcements 16, 18, the plastic spring also has a protective function for structural component parts and components which are enclosed by it so as to be covered.

Figure 5:
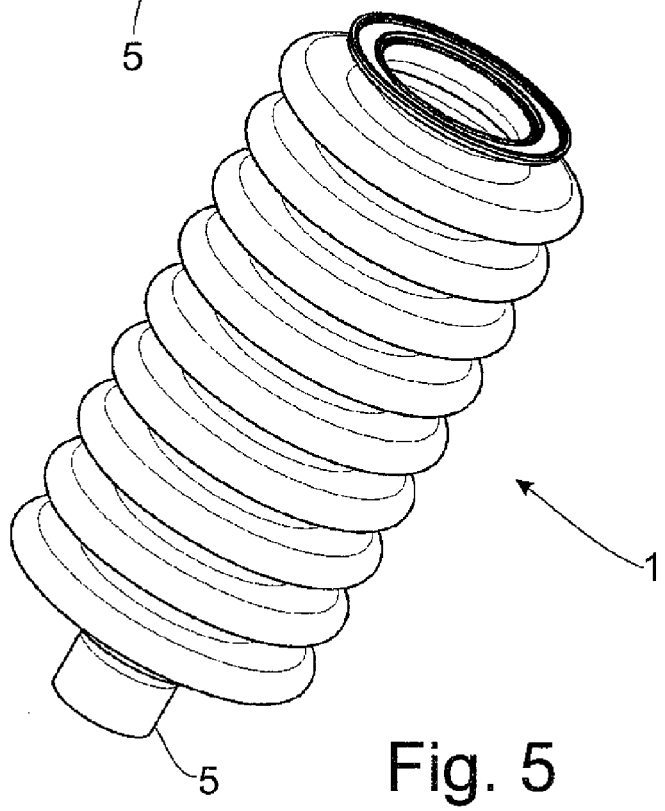
FIG. 5 is a perspective view of the plastic spring.
Figure 6:
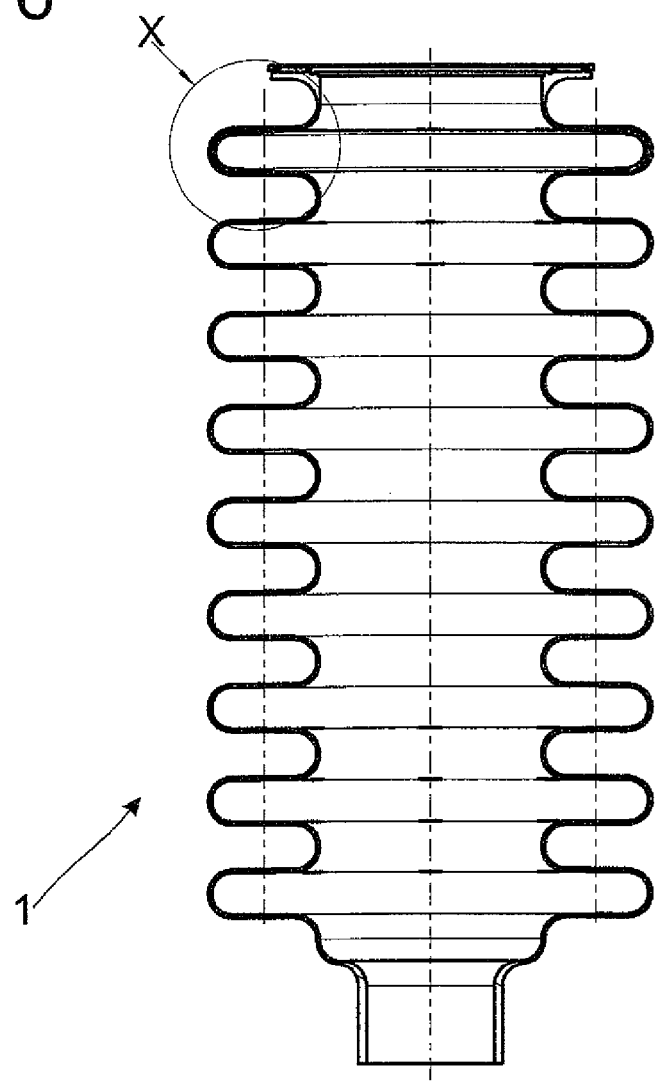
FIG. 6 is the plastic spring according to FIG. 4 with closed check valve.
Figure 7:
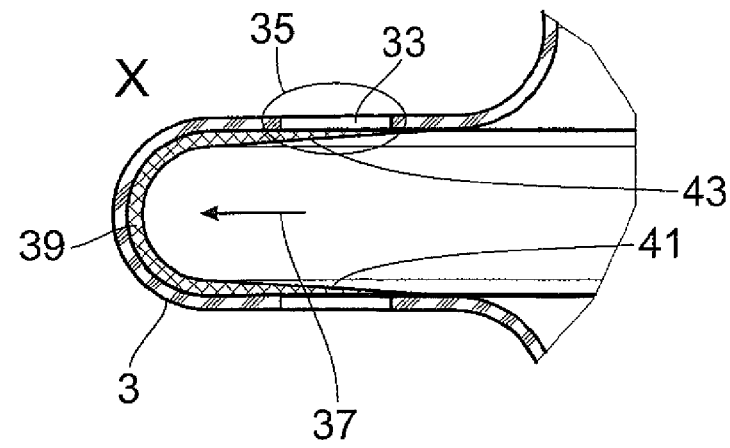
FIG. 7 is a detail referring to FIG. 6.
Figure 8:
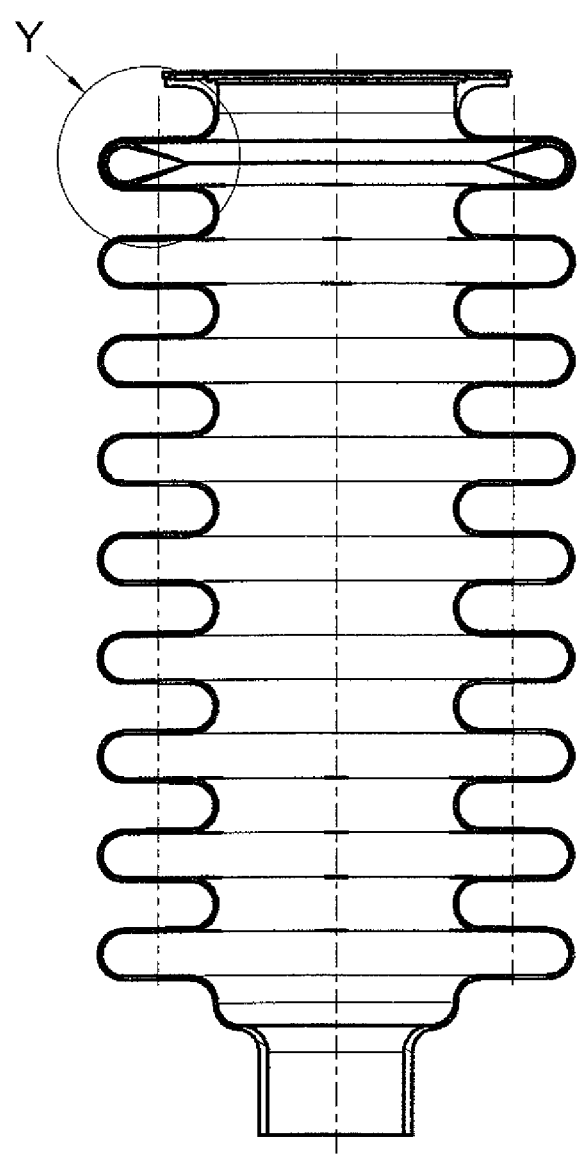
FIG. 8 is the plastic spring according to FIG. 4 with open check valve.
Figure 9:
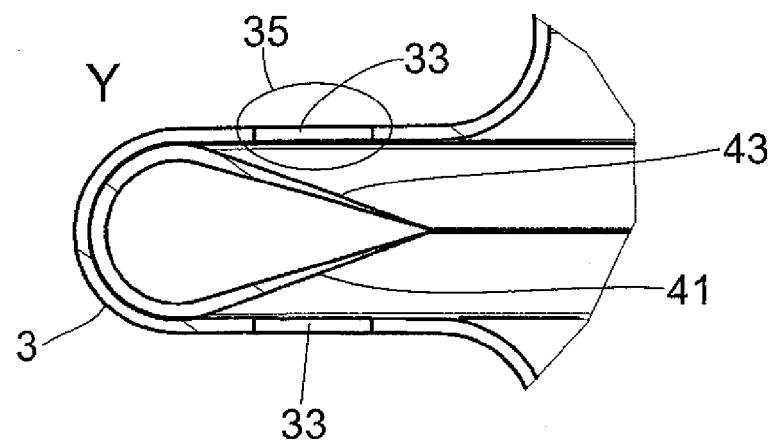
FIG. 9 is a detail referring to FIG. 8.

As is made particularly clear in FIGS. 4 and 5, the connection surface 5 is constructed as a tubular body. This tubular body 5 engages in a cup element 17 on the cylinder side. A receiving space 19 in the cup element 17 can be filled with a primary-formable displacement mass via at least one opening 21 (FIG. 2). Accordingly, the tubular body 5 carries out an axial displacing movement within the cup element 17 by which the preloading of the plastic spring 1 can be adjusted.

The tubular body 5 is formed integral with the corrugated tubular body 3 so that, especially when combined with a cylinder 15 which is likewise made of plastic, a particularly loadable connection can be produced between these structural component parts 5, 15 which effectively prevents unauthorized dismantling of the plastic spring 1.

Considered in conjunction, FIGS. 3 and 5 show the second connection surface 7 of the plastic spring 1, which is operatively connected to a connection member 23 of a piston rod 25 of the vibration damper 13. An axial bearing 27 is formed in the connection surface 7. To this end, the connection surface 7 has an annular groove 29 in which, e.g., a bearing ring or a lubricant filling is contained. Alternatively, a rolling bearing can be constructed in the connection surface so as to enable a particularly low-friction rotational relative movement between the plastic spring 1 and the connection member 23. A catch connection 30 holds the plastic spring 1 at the connection member 23.

FIGS. 6 to 9 show that the plastic spring 1 can have at least one vent opening 33 which is controlled by a check valve 35. Alternatively, the vent opening 33 can also be constructed in the connection member 23 as is shown in FIGS. 1 and 3.

The check valve 35 according to FIGS. 6 to 9 is formed by a flexible valve body 37 which is supported in a convolution of the corrugated tubular body 3. The valve body 37 has a groove shape supported in a convolution of the corrugated tubular body 3 by its groove base 39. The valve body can be produced, e.g., from a longitudinally slit tube which is placed in or on a convolution. The vent opening 33 is also constructed in a convolution of the corrugated tubular body, namely, in the radially extending ribs of the corrugated tubular body 3.

When a valve body is placed on the outer side of the corrugated body, the sides 41, 43 of the groove-shaped valve body 37 lift off the outer lateral surface of the corrugated body 3 during a compression and excess air volume inside the plastic spring can escape via the vent openings 33. However, the embodiment shown in FIG. 7 has the valve body 37 arranged on the inner side so that the excess air volume cannot escape through the vent opening 33 during a compression of the plastic spring 1, but rather is displaced into a ventilation channel 45 which is connected to an inner space 47 of the plastic spring 1 (FIG. 1). The ventilation channel 45 is formed by at least one channel between an outer cylinder, the cartridge 13 and the cylinder 15. The cylinder 15 has at least one connection opening 45 leading to the outer environment.

Accordingly, the plastic spring 1 acts like a pump which removes the heat occurring in a vibration damper 13 from the cylinder 15 along with the excess air volume. When the plastic spring expands again, the sides 41, 43 lift off the inner wall of the corrugated body so that a pressure equilibrium with the environment can be carried out via the open vent openings 49.

Figure 10:
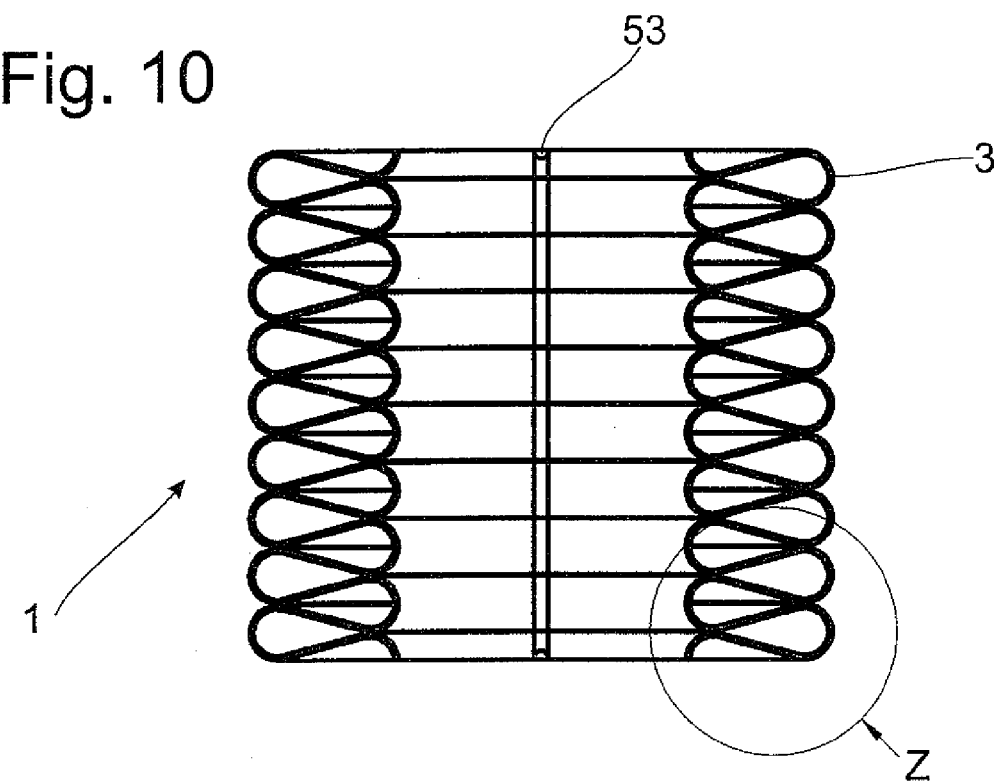
FIGS. 10, 11 are illustrations of the damping function of a plastic spring.
Figure 11:
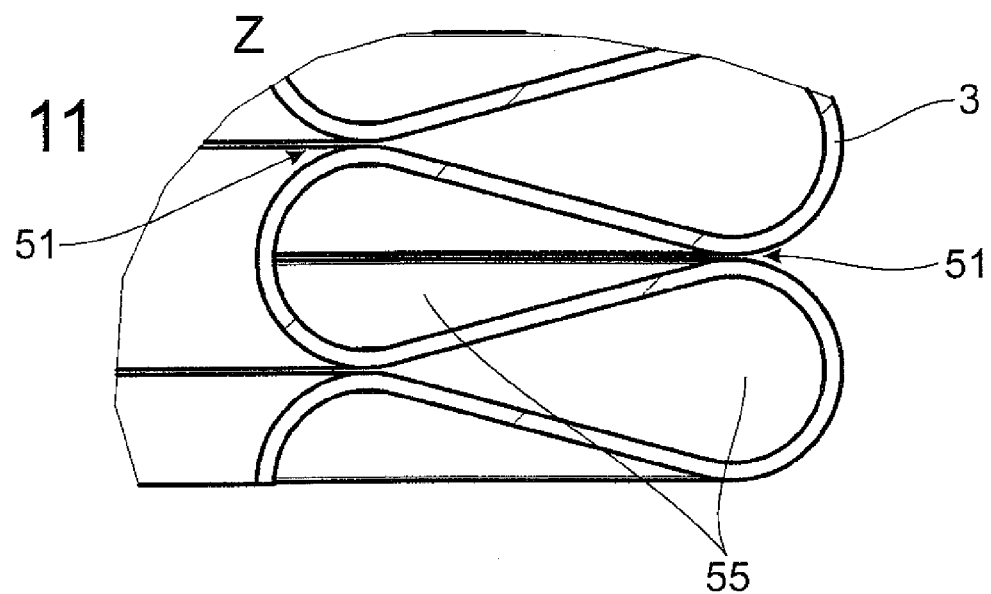

Apart from the mechanical spring action of the plastic spring 1, a damping force generated by the plastic spring 1 can also be used in a variant according to FIGS. 10 and 11. For this purpose, the plastic spring 1 forms at least one throttle cross section 51 between adjacent convolutions of the corrugated tubular body 3 in the solid length operating state (see FIG. 11). A throttle cross section 51 of this kind can be formed, e.g., by at least one groove 53 which determines at least a residual cross section between a damping volume 55 enclosed by a convolution and an area located outside of this convolution. To this end, the groove extends substantially parallel to the longitudinal axis of the plastic spring when the spring is relaxed. This at least one groove 53 can be formed at the inner wall and/or outer wall of the corrugated tubular body. When the plastic spring is compressed beyond the compression state shown in FIG. 10, the air volume enclosed inside the convolutions is displaced through the throttle cross section 51 so as to produce the damping force mentioned above.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A plastic spring for transmitting force between two structural component parts that are movable relative to one another comprising:
   a corrugated tubular body having a first longitudinal end and a second longitudinal end;
   a first connection surface arranged at the first longitudinal end of the corrugated tubular body configured as a tubular body to engage in a cup element of one of the supporting structural component parts;
   a second connection surface arranged at the second longitudinal end of the corrugated tubular body; and
   a displacement mass filled in the cup element,
   wherein the tubular body is configured for a displacing movement within the cup element for axially adjusting a preloading of the plastic spring.

2. The plastic spring according to the preamble of claim 1, wherein the second connection surface is an axial bearing.

3. The plastic spring according to claim 2, wherein the second connection surface further comprises a rolling bearing.

4. The plastic spring according to claim 2, wherein the second connection surface further comprises an annular groove for receiving a bearing ring.

5. The plastic spring according to claim 4, wherein the annular groove further comprises a lubricant filling.

6. The plastic spring according to claim 2, wherein the second connection surface further comprises a catch mechanism configured to fasten to one of the structural component parts.

7. The plastic spring according to the preamble of claim 1, wherein the plastic spring further comprises: at least one vent opening controlled by a check valve.

8. The plastic spring according to claim 7, wherein the check valve is formed by a flexible valve body supported in a convolution of the corrugated tubular body.

9. The plastic spring according to claim 8, wherein the at least one vent opening is formed in a convolution of the corrugated tubular body.

10. The plastic spring according to claim 8, wherein the valve body further comprises a groove shape supported in the convolution by its groove base.

11. The plastic spring according to the preamble of claim 1, wherein the plastic spring further comprises an axially extending fiber reinforcement whose axial fiber length substantially corresponds to an axial distance between the first and second connection surfaces.

12. The plastic spring according to claim 11, wherein at least about 50% of the axially extending fibers have an angular deviation of less than about 30° relative to a longitudinal axis of the plastic spring.

13. The plastic spring according to claim 11, wherein the plastic spring further comprises a circumferential fiber reinforcement extending in circumferential direction, wherein a circumferential fiber length substantially corresponds at least to a coil diameter of the corrugated tubular body.

14. The plastic spring according to claim 11, wherein the axially extending fiber reinforcement and the circumferential fiber reinforcement are a woven fabric.

15. The plastic spring according to claim 1, wherein the plastic spring forms a throttle cross section between two adjacent convolutions of the corrugated tubular body.

16. The plastic spring according to claim 15, wherein at least one groove is formed in a wall of the corrugated tubular body that determines at least a residual cross section between a volume enclosed by a convolution and an area located outside this convolution.

17. The plastic spring according to claim 16, wherein the at least one groove extends substantially parallel to the longitudinal axis when the spring is relaxed.

18. The plastic spring according to claim 17, wherein the at least one groove is formed at one of an inner wall and an outer wall of the corrugated tubular body.

19. The plastic spring according to claim 1, wherein the cup element is a component part of an outer cylinder of a suspension strut, and the outer cylinder is made of plastic.

20. The plastic spring according to claim 19, further comprising:
a vibration damper arranged inside the cylinder as a cartridge; and
at least one ventilation channel connected to an interior space in the plastic spring is provided between an outer cylinder of the cartridge and the inner wall of the cylinder.

21. The plastic spring according to claim 20, wherein the ventilation channel further comprises at least one connection opening to an environment of the cylinder.

22. The plastic spring according to claim 1, wherein the tubular body is integrally formed with the corrugated tubular body.

* * * * *